(12) United States Patent
Cunningham

(10) Patent No.: US 9,035,475 B1
(45) Date of Patent: May 19, 2015

(54) AIR-DROP DEVICE TAIL CHARGER

(75) Inventor: John G. Cunningham, Concord, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 246 days.

(21) Appl. No.: 13/534,083

(22) Filed: Jun. 27, 2012

Related U.S. Application Data

(60) Provisional application No. 61/503,268, filed on Jun. 30, 2011.

(51) Int. Cl.
| F02B 63/04 | (2006.01) |
| F03D 9/00 | (2006.01) |
| B64C 19/00 | (2006.01) |
| H02J 7/00 | (2006.01) |

(52) U.S. Cl.
CPC ............... F03D 9/002 (2013.01); B64C 19/00 (2013.01); H02J 7/0052 (2013.01)

(58) Field of Classification Search
USPC ................. 290/44, 55, 1 A, 1 R; 102/208
See application file for complete search history.

(56) References Cited

U.S. PATENT DOCUMENTS

| 1,311,785 | A | * | 7/1919 | Wildrick | 102/392 |
| 4,161,371 | A | * | 7/1979 | Sheppa | 416/43 |
| 5,115,742 | A | * | 5/1992 | Frazer | 102/208 |
| 5,452,864 | A | * | 9/1995 | Alford et al. | 244/3.23 |
| 6,845,714 | B1 | * | 1/2005 | Smith et al. | 102/208 |
| 2012/0210901 | A1 | * | 8/2012 | Bender | 102/374 |

* cited by examiner

*Primary Examiner* — Tho D Ta
(74) *Attorney, Agent, or Firm* — Sand & Sebolt; Daniel J. Long

(57) ABSTRACT

A system and method for powering an air-drop device is presented. One configuration of the system includes an energy capture device, a generator and an electrical logic unit. The energy capture device converts the movement air passing by the air-drop tail device into kinetic energy. The generator converts that kinetic energy into electrical energy and the electrical logic unit can then be powered by the electrical energy allowing it to perform at least a portion of a mission.

18 Claims, 3 Drawing Sheets

AIR-DROP DEVICE TAIL CHARGER

CROSS REFERENCE TO RELATED APPLICATION

This application claims priority from U.S. Provisional Patent Application Ser. No. 61/503,268 filed Jun. 30, 2011; the disclosure of which is incorporated herein by reference.

BACKGROUND OF THE INVENTION

1. Field of Invention

The current invention relates generally to apparatus, systems and methods for generating electricity. More particularly, the apparatus, systems and methods relate to generating electricity for items dropped through the air. Specifically, the apparatus, systems and methods provide for generating electricity for an item dropped through the air using the motion of the passing air.

2. Description of Related Art

Air-dropped devices have been in use for many years now and are useful in a variety of circumstances. In monitoring weather, air dropped sensors can be dropped through the atmosphere to monitor air temperature, air pressure and other parameters used in forecasting weather. Sensors may also be dropped into locations where the conditions are unfit for humans such as volcanoes to monitor geothermal or other parameters of interest to scientists. The military might use small sensors dropped onto an enemy battlefield to monitor troop movements or monitor other battlefield conditions. Of course, the military has a long history of using air-dropped devices containing explosives.

Many of these remotely deployed sensor devices and other air-dropped devices require power for operation. Power may be supplied to such devices by batteries which are not always reliable or via electromagnetic parasitic acquisition. Devices that rely on parasitic acquisition for their power require time to gradually acquire a charge and are not available for immediate use. A need therefore exists for a better energy source for air-drop devices.

SUMMARY

According to the present disclosure, an air-drop device requiring electrical energy and the capability of being dropped from high altitudes includes a tail charger. The tail charger is connected to the air-drop device and also includes an airflow turbine. The airflow created by the air-drop device will spin the turbine creating mechanical energy. The air-drop device also includes a charge capture module that uses electromagnetic induction to convert the mechanical energy from the turbine into electrical energy.

The preferred embodiment of the invention includes a system for powering an air-dropped tail device. The system includes an energy capture device, a generator and an electrical logic unit. In some configurations of this embodiment, the energy capture device converts the movement of air passing by the air-dropped tail device into kinetic energy. As discussed in the detailed description, the energy capture device can include a pinwheel that rotates when passing through air when the system is dropped. The energy capture device can also include a shaft connected to a center of the shaft and the pinwheel can rotate at least a portion of the generator. For example, a field winding can be rotated by the shaft. The generator converts the kinetic energy into electrical energy. The electrical logic unit is then powered by the electrical energy.

The system can be combined with a mission unit. The mission unit is generally added to the air-dropped tail device before the air-dropped device is dropped through the air. The mission unit executes a mission as the air-dropped tail device descends from a high altitude and/or reaches ground. The electrical logic unit can be located in the mission unit. The mission unit and the electrical logic unit can adjust the flight of the air-dropped tail device as it descends to earth, and/or calculate a value and transmit that value to a remote receiver expecting that value, and/or perform other functions as appreciated by those of ordinary skill in the art.

This configuration of the preferred embodiment can include other components and other useful features. For example, the system can include an electrochemical storage device to store at least some of the electrical energy for later use. The system can include fins to guide air into the energy capture device and to guide the air-dropped tail device as it descends from a high altitude. The air-drop tail device can be an aerodynamic elongated shape with a front end and a back end and can have an axis extending from a center of the front end to a center of the back end. A rotating portion of the rotating air-dropped tail device can rotate about the axis and the rotating portion can rotate at the back end of the air-dropped tail device.

Another configuration of the preferred embodiment is a method for powering an air-dropped tail device that is to be dropped through the air while attached to an air-dropped mission section. The air-dropped tail device includes converting movement between the air-dropped tail device and air the air-dropped tail device is passing through into kinetic energy. As previously mentioned, a propeller at the air-dropped tail device can rotate to create the kinetic energy. The method converts the kinetic energy into electrical energy. Again, a propeller can rotate a portion of an electrical generator. Electromagnetic induction in a typical generator can be used to create the electrical energy. The electrical energy is used to power the air-dropped mission section so that the mission section has power to perform at least part of a mission that the mission section is configured to perform.

In some configurations, the method can include channeling air into an airflow turbine at the air-dropped tail device. The airflow turbine converts the movement between the air-dropped tail device and the air-dropped tail device falling past into kinetic energy. In some configurations, the method may store at least some of the electrical energy in an energy storage device such as a battery for later use.

In another configuration of the method, the air-dropped tail device can be attached to the air-dropped mission section prior to dropping the air-dropped tail device from a high altitude. The mission section can use the electrical energy to adjust the flight of the air-dropped tail device and/or calculate a value and transmit that value to a remote receiver expecting that value or the mission section can perform some other useful function as understood by those of ordinary skill in the art.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
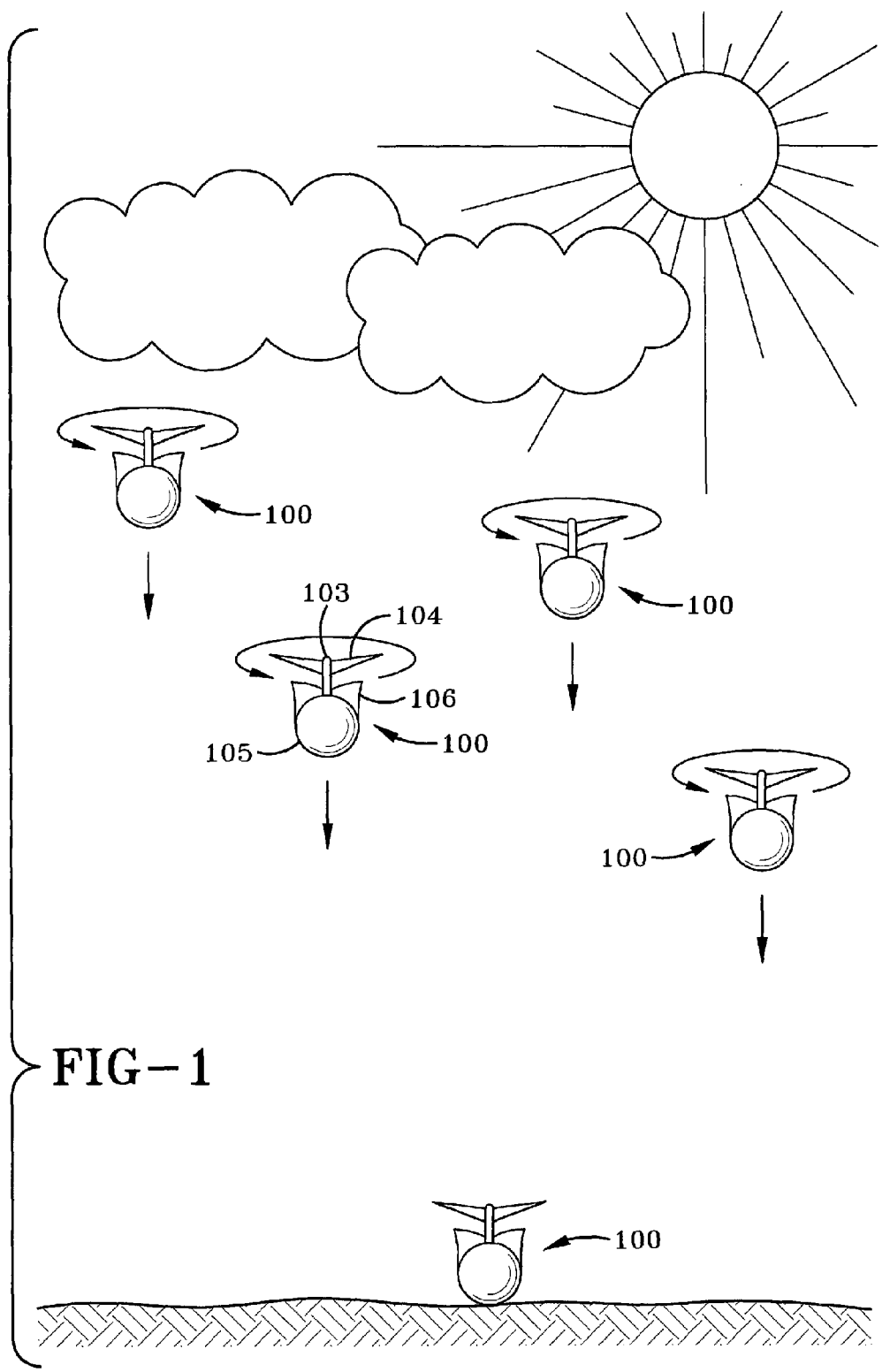
FIG. 1 illustrates the environment in which a preferred embodiment of an air-drop device that can create its own electrical power may operate.

FIG. 1 illustrates example remote sensors and other air-dropped devices 100 that are pulled by gravity through many feet of air before reaching their destinations. The present disclosure in FIG. 2 further illustrates the details of a device 100 that can turn this gravitational force into a source of energy. During an air drop, a tail is mechanically tuned to convert the mechanical energy of the air flowing through and around the tail into electrical energy using electromagnetic induction. Once the electrical energy has been created, it can be stored for use during the device's intended mission. The air-dropped device 100 could be a sensor, a remotely controlled device, or any device that falls through the air at sufficient speeds to create a source for mechanical energy. This configuration removes the need for batteries within the air-drop device 100 and makes the device 100 available for immediate use.

Figure 2:
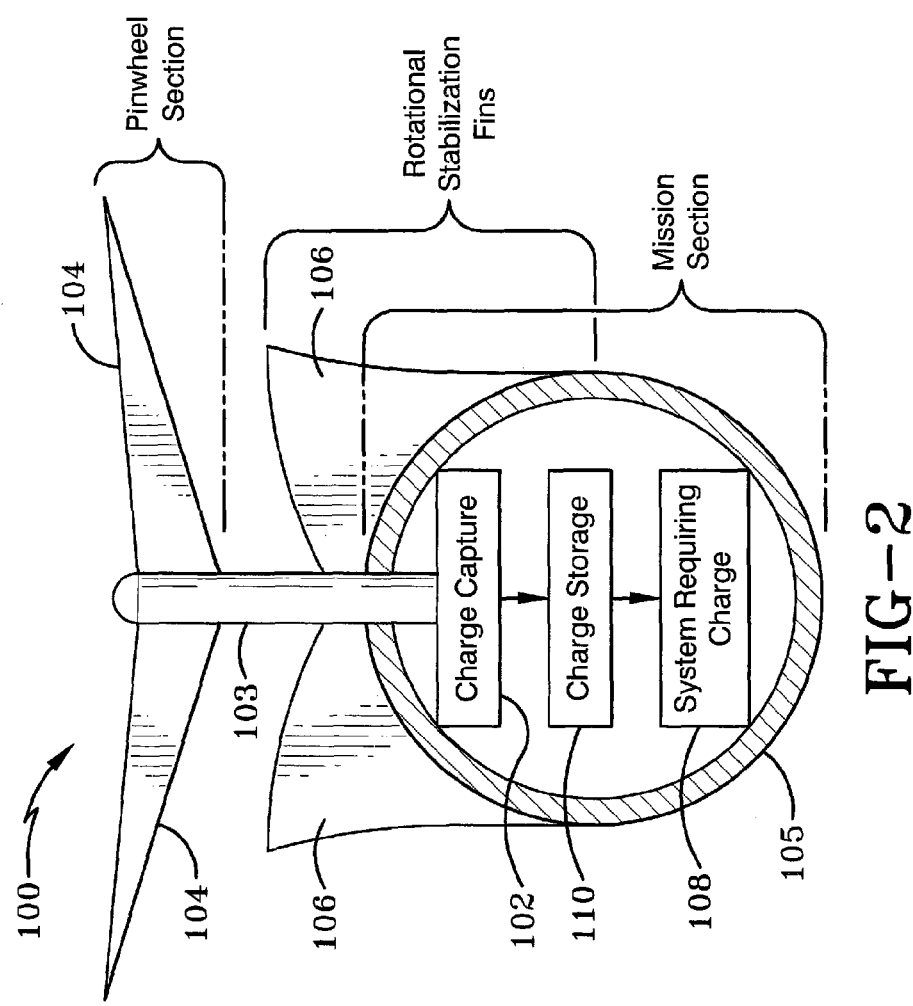
FIG. 2 illustrates the preferred embodiment of an air-drop device that can create its own electrical power.

The pinwheel section shown at the top of FIG. 2 is located on the tail of the air-drop device 100. The pinwheel section may comprise a charge capture device 102 (e.g., air turbine), a number of fan blades 104 connected to a rotational shaft 103, or any other configuration that can convert airflow into work. The tail of the air-drop device 100 is connected to the mission section of the device. The pinwheel section may rotate on the tail of the device, or rotate the entire tail, utilizing the air flowing around it as a source of power as the device travels to its destination. The air flowing through the pinwheel device creates drag and properly orients the device to optimize airflow. The spin of the pinwheel may be further optimized by the position of rotational stabilization fins 106, which orient the mission section with respect to the pinwheel for maximum induction. The stabilization fins 106 are shown in FIG. 1 mounted to the mission section. The mission section shown in FIG. 1 contains an inductive charge capture module 102, a device system that requires charging 108, and may contain a charge storage location 110. The charge capture module 102, can transform the mechanical energy of the rotating pinwheel section into an electrically usable form by electromagnetic induction. This electrical energy may then be stored in a charge storage location 110 for use during the lifecycle of the device's mission. In some configurations, the charge capture module system that requires charging 108 and charge storage location 110 can be considered to form a main body portion 105 of the air-drop device 100.

Figure 3:
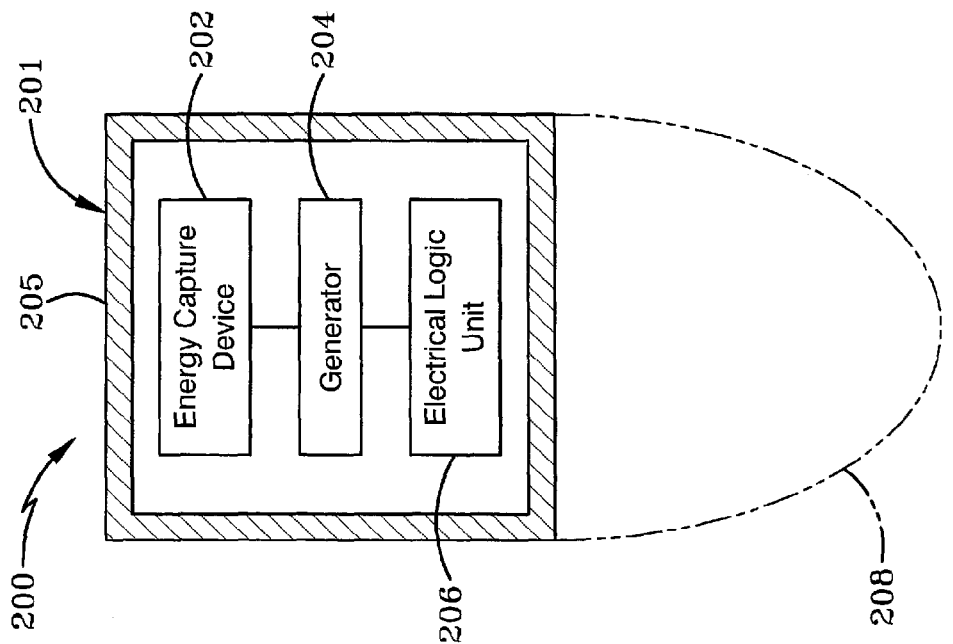
FIG. 3 illustrates another configuration of the preferred embodiment of an air-drop device that can create its own electrical power.

FIG. 3 illustrates another configuration of the preferred embodiment as a system 200 for powering an air-dropped tail device 201. The system 200 includes an energy capture device 202, a generator 204 and an electrical logic unit 206. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logical logic is described, it may be possible to distribute that single logical logic between multiple physical logics. The main body portion 205 of this configuration of the preferred embodiment can include the energy capture device 202, the generator 204 and the electrical logic unit 206.

In this configuration of the preferred embodiment, the energy capture device 202 converts the movement air passing by the air-dropped tail device 201 into kinetic energy. As discussed above, the energy capture device 202 can include a pinwheel that rotates when passing through air when the system 200 is dropped. The energy capture device 202 can also include a shaft connected to a center of the pinwheel and the pinwheel can rotate at least a portion of the generator 204. For example, a field winding can be rotated by the shaft. The generator 204 converts the kinetic energy into electrical energy. The electrical logic unit 206 is then powered by the electrical energy.

The system 200 can be combined with a mission unit 208. The mission unit 208 is generally added to the air-dropped tail device 201 before the air-dropped device 201 is dropped through the air. The mission unit 208 executes a mission as the air-dropped tail device 201 descends from a high altitude and/or reaches ground. The electrical logic unit 206 can be located in the mission unit 208. The mission unit 208 and the electrical logic 206 unit can adjust the flight of the air-dropped tail device 201 as it descends to earth and/or calculate a value and transmit that value to a remote receiver expecting that value and/or perform other functions as appreciated by those of ordinary skill in the art.

This configuration of the preferred embodiment can include other components and other useful features. For example, the system 200 can include an electrochemical storage device to store at least some of the electrical energy for later use. The system 200 can include fins to guide air into the energy capture device 202 and to guide the air-dropped tail device 201 as it descends from a high altitude. The air-drop tail device 201 can be an aerodynamic elongated shape with a front end and a back end and can have an axis extending from a center of the front end to a center of the back end. A rotating portion of the rotating air-dropped tail device 201 can rotate about the axis and the rotating portion can rotate at the back end of the air-dropped tail device 201.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
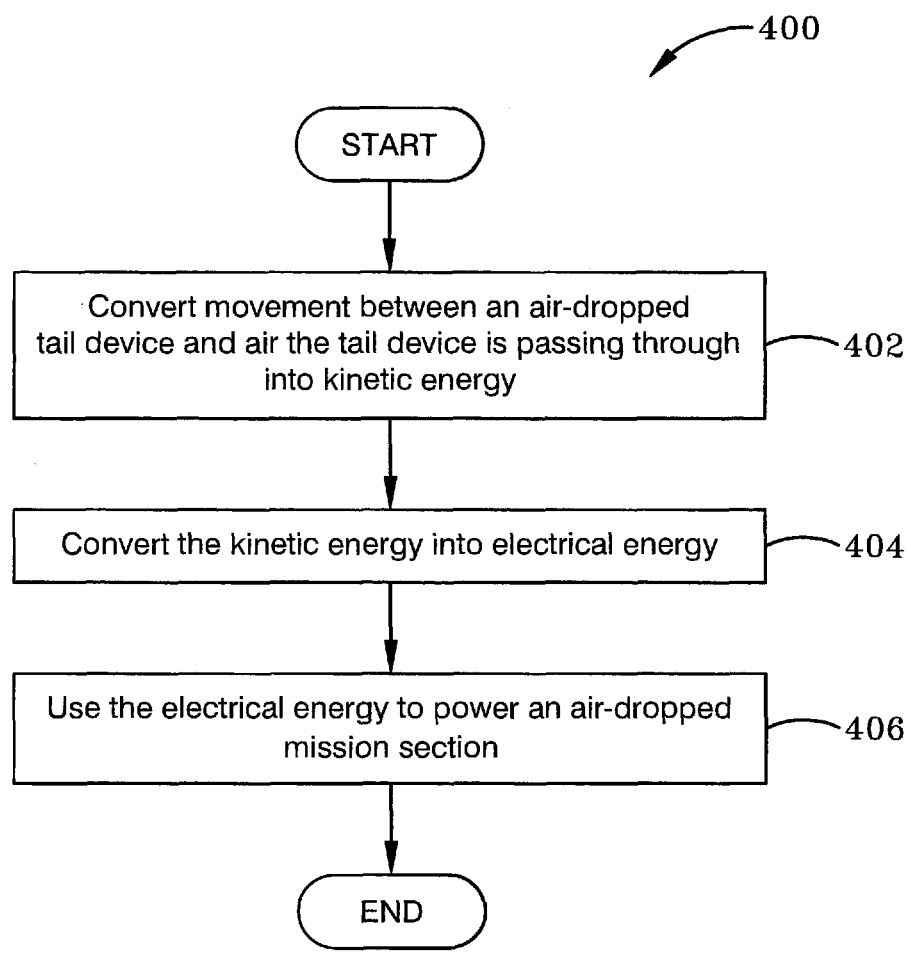
FIG. 4 illustrates an embodiment of a method for creating electrical power in an air-drop device.

FIG. 4 illustrates a method 400 for powering an air-dropped tail device that is to be dropped through the air while attached to an air-dropped mission section. The air-dropped tail device includes converting movement, at 402, between the air-dropped tail device and air the air-dropped tail device is passing through into kinetic energy. As previously mentioned, a propeller at the air-dropped tail device can rotate to create the kinetic energy. The method 400 converts the kinetic energy into electrical energy, at 404. Again, a propeller can rotate a portion of an electrical generator. Electromagnetic induction in a typical generator can be used to create the electrical energy. The electrical energy is used, at 406, to power the air-dropped mission section so that the mission section has power to perform at least part of a mission that the mission section is configured to perform.

In some configurations, the method 400 can include channeling air into an airflow turbine at the air-dropped tail device. The airflow turbine converts the movement between the air-dropped tail device and air the air-dropped tail device is falling past into kinetic energy. In some configurations, the method 400 may store at least some of the electrical energy in an energy storage device such as a battery for later use.

In another configuration of the method 400, the air-dropped tail device can be attached to the air-dropped mission section prior to dropping the air-dropped tail device from a high altitude. The mission section can use the electrical energy to adjust the flight of the air-dropped tail device and/or calculate a value and transmit that value to a remote receiver expecting that value or the mission section can perform some other useful function as understood by those of ordinary skill in the art.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method comprising the steps of:
providing an air-dropped device comprising a mission section, a rotational shaft extending outwardly from the mission section and a pinwheel mounted on the shaft entirely external to the mission section;
dropping the air-dropped device through air to cause the pinwheel to rotate; converting kinetic energy of the rotating pinwheel into electrical energy; and
using the electrical energy to power the mission section so that the mission section has power to perform at least part of a mission that the mission section is configured to perform;
wherein the mission section has a front end and a back end; a plurality of fins are mounted to the mission section and extend rearward beyond the back end of the mission section; and the pinwheel includes a plurality of fan blades connected to the shaft rearward of the fins.

2. The method of claim 1 further comprising:
using the shaft of the pinwheel to rotate a portion of an electrical generator to create the electrical energy.

3. The method of claim 1 further comprising:
using electromagnetic induction to create the electrical energy.

4. The method of claim 1 further comprising:
storing at least some of the electrical energy in an energy storage device.

5. The method of claim 1 wherein the mission section uses the electrical energy to perform at least one of: (a) adjusting the flight of the air-dropped device and (b) calculating a value and transmitting that value to a remote receiver expecting that value.

6. The method of claim 1 further comprising:
preventing rotation of the mission section using stabilization fins.

7. The method of claim 1 wherein the pinwheel is rotatable about an axis and includes a plurality of fan blades; the mission section extends away from the axis; and the fan blades extend away from the axis further than does the mission section in a direction perpendicular to the axis.

8. An air-dropped device comprising:
a mission section having a front end and a back end;
a rotational shaft extending rearward from the back end of the mission section;
a pinwheel which is mounted on the shaft rearward of the back end of the mission section;
a plurality of fins mounted to the mission section adjacent the back end of the mission section extending between the mission section and the pinwheel; and
a generator which creates electrical energy in response to rotation of the pinwheel;
wherein the electrical energy powers the mission section.

9. The air-dropped device of claim 8 further comprising:
an electrochemical storage device configured to store at least some of the electrical energy.

10. The air-dropped device of claim 8 wherein the pinwheel is rotatable about an axis extending from a center of the front end and a center of the back end.

11. The air-dropped device of claim 8 further comprising:
a mission unit configured to execute a mission as the air-dropped device descends from a high altitude and/or reaches ground, wherein the pinwheel and generator are removably attached to the mission unit.

12. The air-dropped device of claim 8 wherein the mission unit is configured to perform at least one of: (a) adjusting the flight of the air-dropped device and (b) calculating a value and transmitting that value to a remote receiver expecting that value.

13. The air-dropped device of claim 8 wherein the pinwheel is rotatable about an axis and includes a plurality of fan blades; the mission section extends away from the axis; and the fan blades extend away from the axis further than does the mission section in a direction perpendicular to the axis.

14. The air-dropped device of claim 8 wherein the fins extend rearward beyond the back end of the mission section;

and the pinwheel includes a plurality of fan blades connected to the shaft rearward of the fins.

15. The air-dropped device of claim 8 wherein the shaft is configured to rotate at least a portion of the generator.

16. The air-dropped device of claim 15 wherein the generator comprises:
   a field winding rotated by the shaft.

17. An air-dropped device comprising:
   a mission section having a front end and a back end;
   a rotational shaft extending from within the mission section and outwardly from the back end of the mission section so that the shaft extends beyond the back end of the mission section;
   a pinwheel which is mounted on the shaft, which is rotatable about an axis extending from the front end to the back end of the mission section, and which is entirely rearward of the back end of the mission section;
   a generator which creates electrical energy in response to rotation of the pinwheel;
   wherein a plurality of fins are mounted to the mission section and extend rearward beyond the back end of the mission section; and the pinwheel includes a plurality of fan blades connected to the shaft rearward of the fins.

18. The air-dropped device of claim 17 wherein the pinwheel is rotatable about an axis and includes a plurality of fan blades; the mission section extends away from the axis; and the fan blades extend away from the axis further than does the mission section in a direction perpendicular to the axis.

* * * * *